United States Patent [19]
Schott et al.

[11] 3,808,810
[45] May 7, 1974

[54] HYDRAULIC MODULATING VALVE

[75] Inventors: Robert E. Schott; Donald W. Longshore, both of New Berlin, Wis.

[73] Assignee: Allis-Chalmers Corporation, Milwaukee, Wis.

[22] Filed: Aug. 27, 1973

[21] Appl. No.: 392,029

Related U.S. Application Data

[63] Continuation-in-part of Ser. No. 317,644, Dec. 22, 1972, Pat. No. 3,780,762.

[52] U.S. Cl............... 60/416, 60/484, 137/596, 60/456, 91/444, 192/4 A
[51] Int. Cl........................ F15b 1/02, F15b 11/16
[58] Field of Search ............ 60/416, 484; 137/596; 91/444; 192/4 A

[56] References Cited
UNITED STATES PATENTS
3,458,999  8/1969  Reis ...................................... 60/416
3,631,950  1/1972  Tanaka ............................. 192/4 A

*Primary Examiner*—Edgar W. Geoghegan
*Attorney, Agent, or Firm*—Arthur L. Nelson

[57] ABSTRACT

A plurality of hydraulic pressure modulating valves with a directional valve to selectively operate the modulator valves. The directional valve is mechanically and hydraulically operated responsive to the modulated pressure of one of the modulating valves.

10 Claims, 6 Drawing Figures

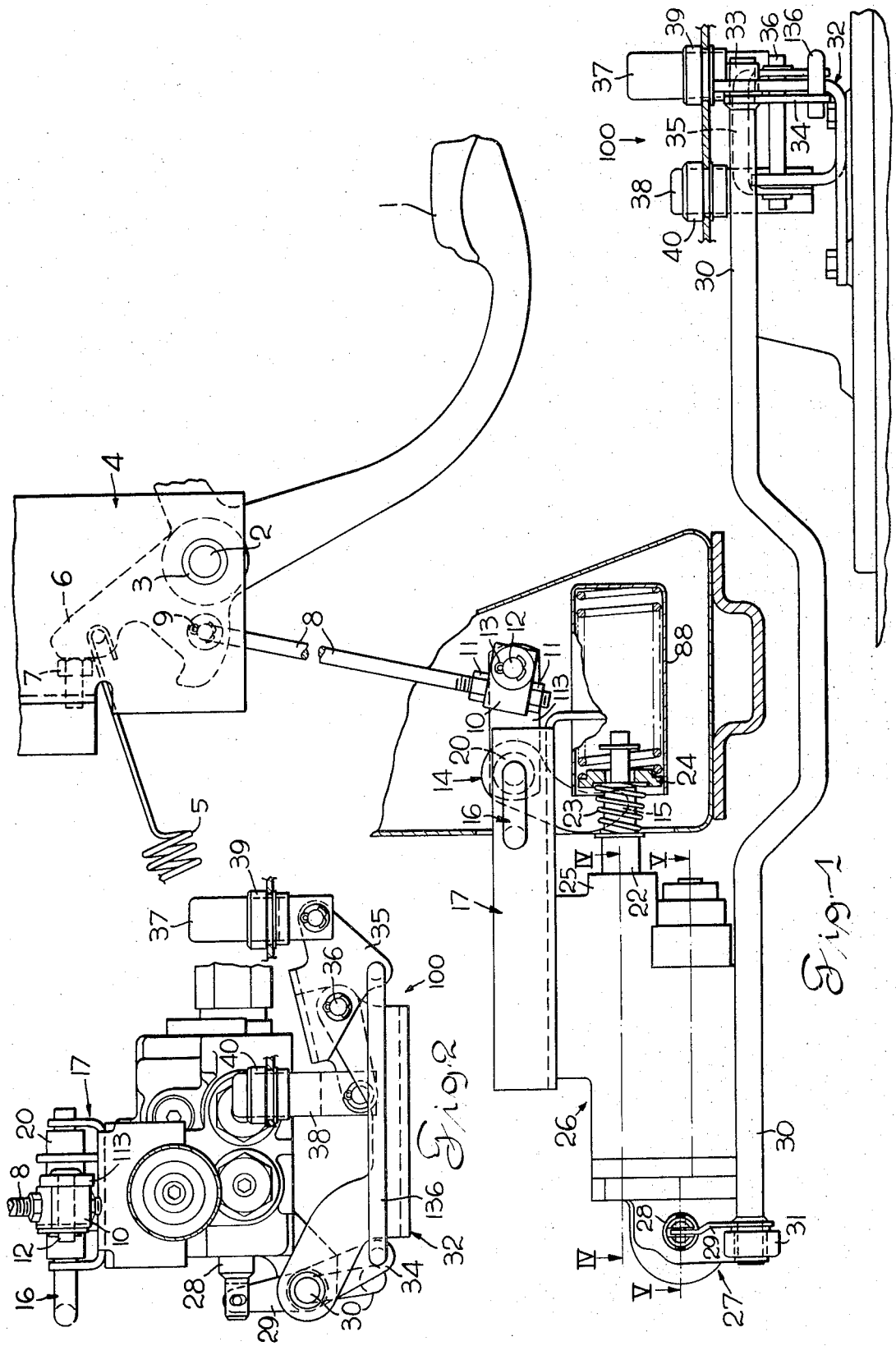

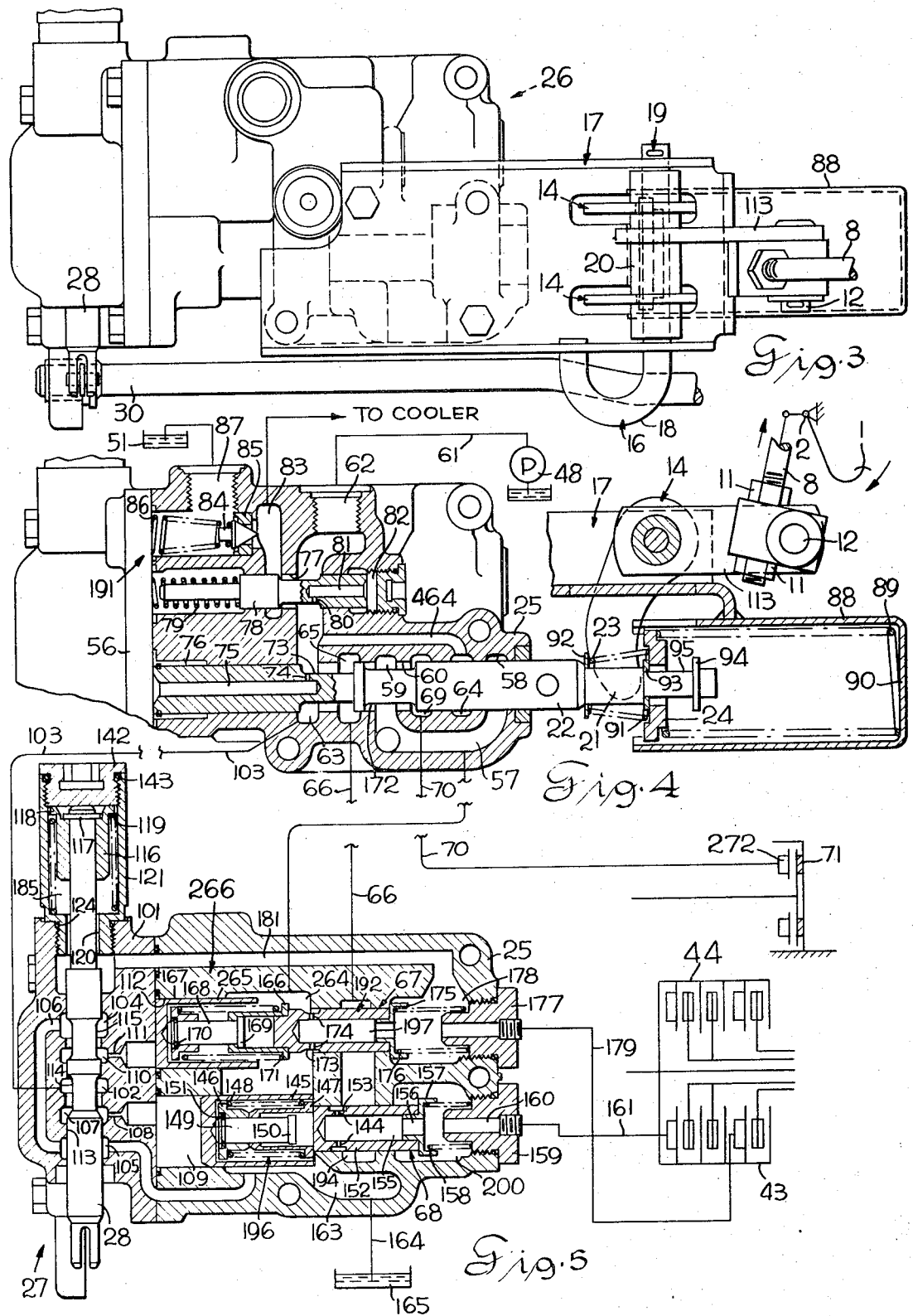

HYDRAULIC MODULATING VALVE

This is a continuation-in-part of application Ser. No. 317,644, filed Dec. 22, 1972, now U.S. Pat. No. 3,780,762.

This invention relates to hydraulic valves and more particularly to a pressure modulating means and directional valve means in conjunction with a hydraulic control valve for controlling clutch operation.

In the process of transferring power from one shaft to another through clutches it is fundamental that the transfer of power should be smooth and gradual. One means of reducing shock as a load is transferred to a drive shaft is by reducing the speed of the engine or the vehicle so that the acceleration or deceleration of the rotating mass is not as great. This however is not always practical and accordingly a means must be devised whereby transfer of power from one shaft to another is accomplished while the shafts are rotating. This can be accomplished by permitting a limited amount of slippage between the clutch plates as the power is transferred from the driving shaft to the driven shaft. With the use of hydraulic actuated clutches this can be accomplished by reducing the initial pressure of the pressurized fluid in the hydraulic actuator on the clutch. Once the hydraulic actuator of the clutch is filled the pressure is gradually increased until no slip is present between the driving and driven clutch plates.

In the event that the drive shaft drives through alternate driven shafts this creates an added problem in that the power must be transferred from one driven shaft to another and prevent any roughness causing excessive strain on the shafts or causing the vehicle to lurch when a clutch is engaged. Accordingly, the power transmission which is driving through from the drive shaft to the driven shaft which is presently engaged must be transferred to a second driven shaft which is to eventually carry the load upon transfer from the first driven shaft. In a hydraulic clutch this can be accomplished by simultaneously reducing the pressure in the actuator of the first clutch driving the first driven shaft which is presently carrying the load and gradually increasing the pressure of the hydraulic actuator of the second clutch which drives the second driven shaft. As the pressure in the first clutch is gradually reduced while simultaneously increasing the pressure in the second clutch, the power is transferred from one driven shaft to another and because of a predetermined amount of slippage in each of the two clutches the synchronization of the shafts can be accomplished without roughness. Eventually the second driven shaft is brought up to speed to a synchronous speed with the drive shaft and the power transfer is complete. Accordingly this invention provides such a means whereby the power transfer from one driven shaft to another is controlled automatically and the operator of the vehicle does not sense any roughness but a smooth transfer of power and a continuous drive from the drive shaft to one of the two driven shafts.

It is an object of this invention to provide a modulated and directional hydraulic control valve means for selectively operating hydraulic brake and clutches.

It is another object of this invention to provide a hydraulic valve with independent modulated control for each of a plurality of clutches.

It is a further object of this invention to provide a manual control valve for operating two clutches with a directional valve and modulating valve for selectively modulating the hydraulic actuators in the clutches to provide smooth transfer of power from one clutch to the other.

It is a further object of this invention to provide a hydraulically and mechanically operated directional valve with the directional valve operating responsive to the hydraulic fluid operating the hydraulic clutches.

It is a further object of this invention to provide a hydraulically and mechanically operated directional valve selectively operating pressure modulators responsive to the control valve pressures supplied to the modulators whereby the directional valve is returned mechanically to a first position when the pressure in the hydraulic operator of the directional valve decreases below a predetermined value.

It is a further object of this invention to provide a manual control valve which operates through the directional valve and pressure modulating means to transfer transmission of power from one clutch to another by modulating the pressurized fluid supplied to each of the hydraulic actuators of the clutches.

The objects of this invention are accomplished by providing a hydraulic system having a source of pressurized fluid connected to a manually operated control valve. A pressure regulating valve controls the pressure supplied to the manually controlled valve. The manually controlled valve operates through a directional valve which can be selectively operated to engage a high range or low range clutch. Connected to each of the outlets of the directional valve is a modulator which initially reduces the pressure of the pressurized fluid supplied to its respective clutch upon actuation. The modulator includes a sleeve reciprocating within a bore and having supporting means to operate as a pressure reducing valve. Accordingly when the directional valve is actuated, it causes one of the accumulators to gradually increase the clutch operating pressure through operation of the mating pressure reducing valve. The other accumulator and its pressure reducing valve gradually reduces the pressure applied to the other clutch. In this manner the directional valve may be operated manually and the modulation of pressure is automatically controlled to provide a smooth transfer of power transmission from one clutch to the other.

The manual control valve is also connected for operation of a hydraulic transmission brake. Accordingly, as one of the clutches is disengaged upon further movement of the pedal, the brake is engaged which brakes the movement of the rotating elements in the transmission. At the selection of the operator the clutches may be engaged or disengaged and the brake may be engaged or disengaged depending on the operation of the vehicle required. To shift from one clutch to the other it is not necessary that the clutch pedal be depressed since the directional valve controls which clutch is engaged and the modulation of pressure automatically transfers power from the one clutch to the other. A further refinement of this device is in the directional valve which is automatically shifted to the low range by mechanical means when there is no pressure in the hydraulic system. The pressurized hydraulic fluid overcomes the pressure of the spring to maintain the directional valve in the high range. The automatic shifting of the directional valve to the low range when the engine is stopped is provided since the vehicle can be started easier in the low range, only the low range clutch requires the energy capacity based on inching.

The preferred embodiment of this invention is illustrated in the attached drawings.

FIG. 1 illustrates a side elevation view of the pedal linkage operating the manually controlled hydraulic valve with a portion of the valve broken away to show its operation in conjunction with the pedal.

FIG. 2 is an end view of the hydraulic valve showing the mechanism operating the directional valve.

FIG. 3 is a plan view of the valve and a portion of the linkage connected to the pedal for operating the valve.

FIG. 4 is a section view taken on line IV—IV of FIG. 1 showing the hydraulic valve and its connection to the linkage of the pedal.

FIG. 5 is a cross section view taken on line V—V of FIG. 1 showing the directional valve and the accumulators with modulating means together with a schematic illustration of the brake and clutches to be actuated.

Figure 6:
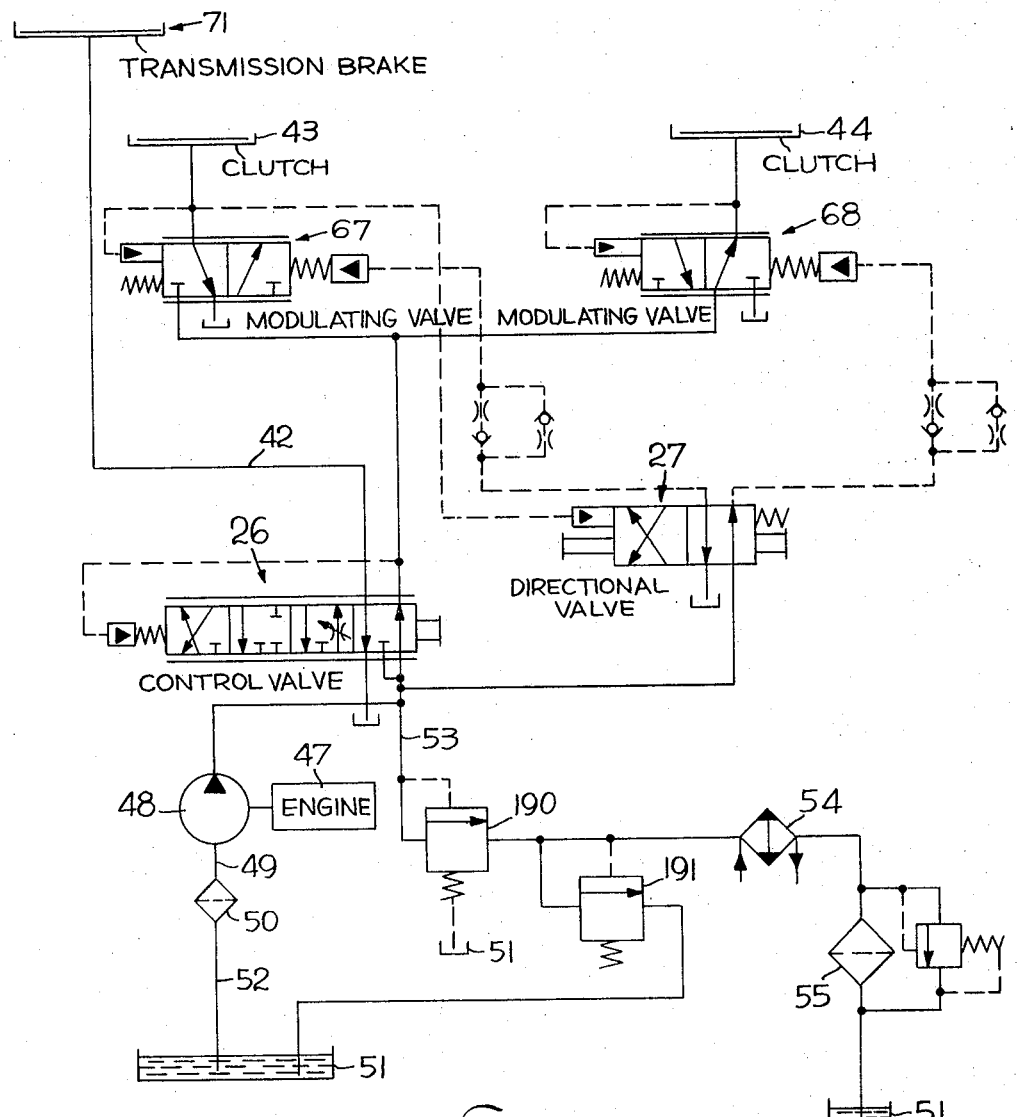
FIG. 6 is a schematic illustration showing the general operation of the hydraulic system.

Referring to drawings, FIG. 1 shows pedal 1 pivotally mounted on the pin 2 which is pivotally supported in the bushing 3 carried in the bracket 4. The pedal 1 is retracted to its return position by the return spring 5 and the arm 6 engages the abutment consisting of the head of a bolt 7 mounted in the bracket 4. Connected to the pedal 1 is a rod 8 fastened by a key 9. The lower end of the rod 8 threadedly engages a block 10 and is locked by the nuts 11. The block 10 carries a pin 12 fastened by the key 13 to provide pivoting movement between the pin 12 and the rod 8. The pin 12 is pivotally supported in the arm 113 of the bell crank 14 also having a finger 15. The bell crank 14 is pivotally supported on the shaft 16 which is nonrotatably fastened in the mounting 17 by the curved portion 18. A shaft 16 is retained in position by the key 19. A bell crank 14 also includes sleeve 20 which receives the shaft 16.

The fingers 15 and 21 straddle the spool 22 and the spring 23. The fingers 15 and 21 engage the plate 24 to operate the spool. The spool 22 reciprocates within the housing 25 of the manual control valve 26.

A directional valve 27 is operated by push buttons and a linkage arrangement. The linkage arrangement operates the directional spool 28 through the lever 29. Lever 29 is integral with a shaft 30 which rotates within the bearing 31 formed by a portion of housing 25. The shaft 30 extends along the underside of the manual control valve 26 and is supported at its opposite end by the support bracket 32 which carries a bearing 33. The shaft 30 is integral with the lever 34 which rotates shaft 30 on its axis and operates the directional valve spool 28 reciprocally within its housing.

The foot lever 35 is pivotally supported on the shaft 36. The pivot movement of the lever 35 is transmitted to the link 136 to provide limited rotation of the shaft 30 around its axis. The pivoting movement of the foot lever 35 is produced by manual operation of the buttons 37 and 38. The button 37 is supported in a sleeve 39 mounted on the platform. Similarly a sleeve 40 receives the button 38 for reciprocal movement of the button 38. It can be seen that the foot lever 35 pivots in response to downward pressure of either of the buttons 37 or 38. The directional valve 27 is adapted for operation by the foot of the operator.

Referring to FIG. 6 the schematic diagram illustrates the hydraulic system. Manual control valve 26 operates the transmission brake 71 through the conduit 42. The clutches 43 and 44 are operated by the manual control valve operating in conjunction with the directional valve 27 and the modulating valves 67 and 68. Although the manual control valve 26 can be operated as a throttling device for engaging and disengaging of the clutches, the pressure of the actuating fluid to operate the clutches is modulated automatically when the directional valve 27 is operated. With one of the clutches 43 or 44 engaged and the directional valve being shifted to another position, the modulating valves control disengagement of the first clutch and engagement of the second clutch simultaneously with a smooth transition of power from one clutch to the other.

The engine 47 drives the hydraulic pump 48 which receives hydraulic fluid through the conduit 49 and filter 50 which are connected to the reservoir by the conduit 52. The bypass conduit 53 returns fluid to the reservoir 51 and also transmits fluid to the cooling circuit including the heat exchanger 54, which in turn returns the hydraulic fluid through the filter 55 to the reservoir 51.

Referring to FIG. 3, the control valve is shown in plan view with a portion of the operating linkages connected thereto. FIG. 4 and FIG. 5 are cross section views taken on planes shown in FIG. 1. FIG. 4 and FIG. 5 are aligned to show the interconnection of the various passages in the two sections of the valves and their connection with the brake and clutches.

Referring to FIG. 4 the control valve spool 22 reciprocates in the manual control valve housing 25. The control housing 25 defines a bore 60 extending through the housing for receiving the control valve spool 22. The end plate 56 is fastened to the end of the housing 25 to form the valve assembly. The sump passage 57 is connected to the sump chamber 58 and the sump chamber 59 which defines enlarged annulus around the bore 60 which receives the spool 22. Conduit 61 is connected to the pump 48 and inlet passage 62. The inlet passage 62 extends into the high pressure chamber 63. The high pressure chamber 63 is connected to the cross passage 464 to the pressure chamber 64. The clutch actuating chamber 65 is connected to the conduit 66 and the modulating valves 67 and 68. The brake actuating chamber 69 is connected through the conduit 70 to the brake 71. The brake 71 has a brake cylinder 272 for actuating the brake 71.

The spool 22 is formed with an annular brake actuating recess 172 and an annular clutch actuating recess 73. The annular clutch actuating recess 73 is also formed with a radial passage 74 in communication with the axial passage 75. This places communication between the clutch actuating annular recess 73 and the pressure chamber 76 on the end of the spool which assists in moving the spool in the right hand direction when pressurized fluid is present in the annular recess 73.

Inlet passage 62 is in communication with the cylindrical opening 77 which receives pressure regulating valve element 78. Pressure regulating valve element 78 is normally biased to the right hand position by the valve spring 79. When pressure is present in inlet passage 62, pressurized fluid flows through the radial port 80 and the axial port 81 to the pressure chamber 82. With an increase in pressure in the pressure chamber 82 the valve element 78 is biased to the left hand position permitting flow through the bypass cooling passage 83. With an increase in pressure, however, the bypass valve element 84 unseats from its valve seat 85 against the force of spring 86 to permit pressurized fluid to flow through the sump passage 87 to the reservoir 51.

The manual control valve spool 22 is operated by the fingers 21 and 15 which engage the pressure plate 24. Pressure plate 24 extends transversely within the spring housing 88. The pressure plate engages the spring 89 which is compressively positioned between the wall 90 of the spring housing 88 and the pressure plate 24. Pressure plate 24 is also engaged by the spring 91 which is compressively in position between the washer 92 and the pressure plate. The washers 93 and 94 are in spaced relation on the annular groove 95 on the end of the spool 22. This provides a lost motion device of the pressure plate between the washers 93 and 94. This lost motion device will be subsequently described.

It is noted that the spring retainer 88 is mounted on the bracket 17 which supports the bell crank 14. Accordingly, the manual control valve is operated by pulling of the manual control valve spool 22 as the foot pedal 1 is operated and pressure in pressure chamber 76 augments movement of the spool.

The directional valve 27 is operated in response to the push button linkage 100. The push button linkage 100 moves the directional valve spool 28 reciprocally within the directional valve housing 101. The directional valve housing defines the high pressure chamber 102 connected through conduit 103 to the high pressure chamber 63. The sump cahmbers 104 and 105 are connected through the connecting passage 106. Accumulator operating chamber 107 is connected through the orifice 108 to the accumulator chamber 109. Similarly, the accumulator operating chamber 110 is connected through the orifice 111 to the accumulator chamber 112. The directional valve spool 28 is received within the bore 113 and reciprocates within the housing 101. The spool 28 defines a recess 114 and a recess 115 for transmission of pressurized fluid from the chamber 102 selectively through one of the orifices 108 or 111.

The spool 28 extends upwardly where it is received within a piston 116 and fastened by a lock washer 117. The piston 116 forms a spring seat 118 for compressively positioning the spring 119 between the cylinder 121 and the piston 116.

The bore 120 forms a clearance around the spool 28. The cylinder 121 threadedly receives the cap 142. The cap and cylinder are fitted with a seal 143 while the bushing and the directional valve housing are fitted with a seal 124 to make a sealed assembly.

The control valve housing 25 defines an accumulator chamber 109 which receives the accumulator piston 145. The accumulator piston 145 receives a pair of spring retainers 146 and 147 positioned on spring 148. Spring retainers 146 and 147 are carried on the stem 149 which defines a head 150 and annular recess for receiving the snap ring 151. The retainer 147 engages the valve sleeve 152 forming an annular recess 153 and radial ports 144. The valve sleeve 152 defines a central opening 155 in communication through central opening 156 of the spring retainer 157. The spring 158 is compressively positioned between the fitting 159 and the spring seat 157. The fitting 159 provides an opening 160 in communication with the conduit 161 to the low speed clutch 44. The sump chamber 163 is in communication through the sump passage 164 to the reservoir 165.

Similarly, the control valve housing 25 defines the accumulator chamber 112 which receives the accumulator piston 265. The spring retainers 166 and 167 are positioned on the stem 168. The head 169 and snap ring 170 retain the spring retainers 166 and 167 on the stem. The spring 171 is compressively positioned between the retainers 166 and 167. The valve sleeve 192 engages the spring retainer 166 and defines an annular recess 173 in communication with the radial port 174. The valve sleeve 192 receives spring retainer 175. Spring 176 is compressively positioned between the spring retainer 175 and the fitting 177. The fitting 177 provides communication between the chamber 178 and conduit 179 and the high range clutch 43. Chamber 178 is connected through the passages 181 to the pressure chamber 185. When the pressurized fluid is present in the chamber 178, it is transmitted to pressure chamber 185 to retain the spool 28 in the position for operating the high range clutch 43.

The operation of this device will be described in the following paragraphs.

The pump 48 operates as a source of pressurized fluid for supplying pressurized fluid to the inlet passage 62. The pressurized fluid operates the pressure regulator valve 190 for maintaining a relatively constant pressure in the high pressure chamber 63. Pressurized fluid is bypassed through the pressure regulating valve 190 to the cooler and heat exchanger 54 and then returned to sump 51. In event of buildup of pressure in the cooler line, the bypass valve 191 permits the bypass of fluid to the reservoir 51.

Pressurized fluid in the inlet passage 62 flows through the radial port 80 in the axial passage 81 in the valve element 78. This produces a biasing force against the spring 79 to vary the opening between the inlet passage 62 and the cooling passage 83 to control the pressure in the high pressure chamber 63.

Normally the foot pedal 1 is in the retracted position as shown in FIG. 1 in response to the biasing force of a spring 5. As the pedal is depressed, the pedal rotates clockwise causing a counterclockwise rotation of the bell crank 14. With one of the clutches actuated, the spool 22 of the manual control valve 26 is in the position shown. As the pedal is depressed the spool moves in the right hand direction causing the annular recess 73 to move in the right hand direction. In this position of the spool 22, pressurized fluid is passing through the radial port 74 and the axial passage 75 to the pressure chamber 76. The biasing force of pressurized fluid in the chamber 76 assists the movement of the spool 22 in a right hand direction and functions as a variable pressure reducing valve as the pedal is depressed. These forces operate against spring 23 to move the spool in the righ hand direction. When the spool has moved sufficiently the fluid from the high pressure chamber 63 is throttled as it passes to the clutch actuating chamber 65 and pressure on the fluid supplied to the clutch is diminished. With further movement of the spool in the right hand direction, the clutch actuating chamber 65 and the high pressure chamber 63 are no longer in communication and the clutch is disengaged. As the spool 22 is moved further in the right hand direction, the recess 172 connects the high pressure chamber 64 with the brake actuating chamber 69 which in turn supplies pressurized fluid through the conduit 70 to the hydraulic actuator 272 to actuate the brake 71. Actuation of the brake is through the mechanical linkage to pull the spool and operate the control valve as a volume metering directional valve. When the pedal 1 is released, the spool 22 moves in the left hand direction in response to the biasing force of the springs 89 and 23. The spool moves in the left hand direction to place communication between the sump chamber 57 and the brake actuating chamber 69. This releases the brake.

As the pedal further retracts, communication is provided between the high pressure chamber 63 and the clutch actuating chamber 65 at which time pressure begins to build up in the high pressure chamber 194. Depending on which direction the directional valve 27 is positioned, the pressurized fluid flows into an accumulator chamber to position the accumulator as shown by accumulator 196 shown in FIG. 5. With the accumulator positioned as shown and the pressure reducing valve 68 positioned as shown, pressurized fluid in chamber 194 is transmitted through the conduit 161 to activate the low range clutch 44.

If it is desired to operate the high range clutch, the push button 38 is depressed which causes the lever 35 to pivot on its axis and pull the link 35 to the right as viewed in FIG. 2. With the link moved to the right, the lever 29 pulls the directional valve spool 28 out of the housing. Pressurized fluid in the high pressure chamber 102 is allowed to flow through the annulus 115 to the chamber 110 through the orifice 111 and to the accumulator chamber 112. The accumulator piston 265 moves in the right hand direction carrying the valve sleeve 192 in the right hand direction permitting communication between the chamber 194 through radial port 174 and out of the conduit 179 to operate the high range clutch 43. The pressure reducing valve 67 operates as a variable pressure reducing valve. As the accumulator pressure builds up, the sleeve 192 moves in the right hand direction and permits the flow of pressurized fluid to the clutch.

When the radial port 174 is in communication between the chamber 194 and passage 197, the buildup through conduit 179 is gradual to actuate the high pressure clutch 43. Pressurized fluid in the chamber 178 passes through the passage 181 then into the pressure chamber 185. With pressure in the chamber 185 the spool 28 is maintained in its high pressure operating range position due to the pressurized fluid in the chamber opposing the force of the spring 119. This pressure maintains the spool in this position until such time that the pressure is decreased. This condition is present when the engine is stopped and then the spring 119 will bias the spool back to the position for supplying fluid for the operation of the low range clutch 44. Throttling of the control valve 26 causing clutch slippage can also reduce the pressure in chamber 185 sufficiently to cause the directional valve to shift to low range. This provides smooth operation of the vehicle when the clutch is in the low range position when starting the vehicle.

As the accumulator 266 is operating and moving the pressure reducing valve sleeve 192 to its operating position to actuate the high range clutch 43, the accumulator 196 is returning to a retracted position in the left hand direction. This in turn carries the pressure limiting groove in the left hand direction, and this provides communication from the chamber 200 through the passage 155 to sump chamber 163. With high pressure fluid cut off from passage 155, pressure in passage 160 is released through the radial port 144. This releases the pressure in the low range clutch 44 and disengages clutch 44. The two accumulators are operating in reverse relative to each other, and while one clutch is engaging the other clutch is disengaging and there is provided a smooth transition of power from one clutch to the other.

The embodiments of the invention in which an exclusive property or privilege is claimed are defined as follows:

1. A hydraulic control system comprising, a first accumulator including a plunger defining a variable volume chamber, resilient means biasing said plunger to minimum volume position, means defining a first pressure modulating chamber adapted for connection to a first hydraulic clutch, a control valve, a first pressure reducing valve selectively connecting said control valve with said first pressure modulating chamber and connecting said first pressure modulating chamber to sump for discharge of fluid in response to operation of said plunger in said first accumulator, a second accumulator including a plunger defining a variable volume chamber, resilient means biasing said second plunger to a minimum volume position, means defining a second pressure modulating chamber adapted for connection to a second hydraulic clutch, a second pressure reducing valve selectively connecting said control valve to said second modulating chamber and connecting said second modulating chamber to sump for discharge of fluid in response to operation of said plunger in said second accumulator, a directional valve, means in said directional valve defining a high pressure chamber, means in said directional valve defining a first accumulator operating chamber connected to said first accumulator and a second accumulator operator chamber connected to said second accumulator, a valve element in said directional valve for selectively connecting said high pressure chamber of said directional valve to said first accumulator operating chamber and to said second accumulator operating chamber, a resilient member normally biasing said valve element in a first direction, means including said valve element defining a fluid pressure chamber connected to said second pressure modulating chamber for biasing said valve element in a second direction against the force of said resilient member, said control valve defining a pump pressure chamber adapted for connection to a source of pressurized fluid, a control valve element in said control valve for connecting said pump pressure chamber in said control valve to said high pressure chamber in said directional valve and selectively connecting said pump pressure chamber in said control valve to said first pressure modulating chamber and said second modulating chamber in said modulators, to thereby control pressurization of said modulating chambers responsive to operation of said directional valve.

2. A hydraulic control system as set forth in claim 1 wherein said directional valve element defines a spool reciprocally mounted in said directional valve.

3. A hydraulic control system as set forth in claim 1 wherein said directional valve element defines a spool normally biased in the first direction by said resilient member to preferentially operate said first clutch in response to positioning of said directional spool by said resilient means.

4. A hydraulic control system as set forth in claim 1 wherein said directional valve element includes a spool, manual means for operating said spool, means defining a passage means in communication with said second modulating chamber and said fluid pressure chamber to thereby provide pressurized fluid in said pressure chamber to overcome the force of said resilient member on said directional valve spool when said second accumulator is operated.

5. A hydraulic control system as set forth in claim 1 wherein said control valve includes a spool, a manual control for reciprocating said spool for selective operation of said modulator and said clutches to thereby throttle pressurized fluid from said control valve to said modulators and cause said directional valve to shift in response to said resilient member when the pressure in said fluid pressure chamber falls below a predetermined value to thereby preferentially operate said first clutch.

6. A hydraulic control system as set forth in claim 1 including manual actuating means for actuating said valve element in said directional valve to selectively operate said second accumulator for pressurizing said second modulating chamber and providing pressure in said fluid pressure chamber to hold said directional valve in the position operating said second accumulator.

7. A hydraulic control system as set forth in claim 1 including manual actuating means operating said valve element of said directional valve, said valve element defining a spool having an end portion in said fluid pressure chamber for biasing said spool against the force of said resilient member to hold said directional valve in a position for operation of said second accumulator.

8. A hydraulic control system as set forth in claim 1 including mechanical means connected to said valve element in said directional valve for selectively positioning said valve element for selective and alternative operation of said first accumulator and said second accumulator.

9. A hydraulic control system as set forth in claim 1 wherein said control valve includes manual clutch control means connected to said control valve element to selectively reduce the pressure to the modulators and the pressure to actuate the hydraulic clutches, said resilient member of said directional valve thereby overcoming the pressure in said second modulating chamber and said fluid pressure chamber to selectively move said directional valve element to pressurize the first modulating chamber for applying the first hydraulic clutch.

10. A hydraulic control system as set forth in claim 1 wherein said control valve includes control means connected to said control valve element for selectively reducing the pressure to said modulators and to reduce the pressure in said second modulating chamber below a predetermined value to thereby permit said resilient member to bias said directional valve element of said directional valve in the first direction.

* * * * *